United States Patent
Thuilliez et al.

(10) Patent No.: US 10,822,475 B2
(45) Date of Patent: Nov. 3, 2020

(54) ETHYLENE/BUTADIENE COPOLYMER OF HOMOGENEOUS MICROSTRUCTURE

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Nuno Pacheco, Clermont-Ferrand (FR)

(73) Assignee: COMPAGNIE GENERALE DES ETABLISSEMENTS MICHELIN CLERMONT-FERRAND (FR)

( * ) Notice: Subject to any disclaimer, the term of this patent is extended or adjusted under 35 U.S.C. 154(b) by 42 days.

(21) Appl. No.: 16/062,343

(22) PCT Filed: Dec. 16, 2016

(86) PCT No.: PCT/FR2016/053537
§ 371 (c)(1),
(2) Date: Jun. 14, 2018

(87) PCT Pub. No.: WO2017/103543
PCT Pub. Date: Jun. 22, 2017

(65) Prior Publication Data
US 2018/0371214 A1  Dec. 27, 2018

(30) Foreign Application Priority Data
Dec. 17, 2015 (FR) ..................... 15 62573

(51) Int. Cl.
| | | |
|---|---|---|
| C08L 9/00 | (2006.01) | |
| C08F 210/02 | (2006.01) | |
| C08F 236/06 | (2006.01) | |
| C08F 4/6192 | (2006.01) | |
| C08F 210/16 | (2006.01) | |

(52) U.S. Cl.
CPC ............ *C08L 9/00* (2013.01); *C08F 4/61922* (2013.01); *C08F 210/02* (2013.01); *C08F 210/16* (2013.01); *C08F 236/06* (2013.01); *C08F 2500/21* (2013.01); *C08L 2207/04* (2013.01); *Y02P 20/582* (2015.11)

(58) Field of Classification Search
CPC ............................ C08F 210/02; C08F 236/06
See application file for complete search history.

(56) References Cited

U.S. PATENT DOCUMENTS

| | | |
|---|---|---|
| 3,910,862 A | 10/1975 | Barbabas et al. |
| 2005/0239639 A1 | 10/2005 | Monteil et al. |
| 2008/0009564 A1 | 1/2008 | Robert et al. |
| 2008/0156404 A1 | 7/2008 | Brunelet et al. |
| 2009/0292063 A1 | 11/2009 | Robert et al. |
| 2015/0315356 A1 | 11/2015 | Schnell et al. |
| 2015/0353716 A1 | 12/2015 | Thuilliez et al. |

FOREIGN PATENT DOCUMENTS

| | | |
|---|---|---|
| EP | 0526955 A1 | 2/1993 |
| EP | 1829901 A2 | 9/2007 |
| EP | 2599808 A1 | 6/2013 |
| WO | 2004035639 A1 | 4/2004 |
| WO | 2005087859 A1 | 9/2005 |
| WO | 2006061064 A1 | 6/2006 |
| WO | 2007017060 A1 | 2/2007 |
| WO | 2014082919 A1 | 6/2014 |
| WO | 2014114607 A1 | 7/2014 |

OTHER PUBLICATIONS

Hajar Nsiri, et al.: Ethylene-Butadiene Copolymerization by Neodymocene Complexes: A Ligand Structure/Activity/Polymer Microstructure Relationship Based on DFT Calculations; ACS Publications, 2015 American Chemical Society, ACS Catal. 2016, 6, 1028-1036.
Julien Thuilliez, et al.: ansa-Bis(fluorenyl) neodymium Catalysts for Cyclocopolymerization of Ethylene with Butadiene; 2009 American Chemical Society, Macromolecules 2009, 42, 3774-3779.
Mario Bruzzone, et al.: Ethylene-Butadiene Copolymers, 1; Preparation with Modified Vanadium Catalysts; Jan. 4, 1977.
Zhichao Zhang, et al.: Polymerization of 1,3-Conjugated Dienes with Rare-Earth Metal Precursors, Struct Bond (2010) 137: 49-108.
International Search Report issued for PCT parent appln PCT/FR2016/053537 dated Mar. 22, 2017.
French Preliminary Search Report dated Aug. 17, 2016 for priority application FR 1562573.

*Primary Examiner* — Jeffrey C Mullis
(74) *Attorney, Agent, or Firm* — Dickinson Wright PLLC (57) ABSTRACT

An ethylene/butadiene copolymer comprising statistically distributed ethylene units butadiene units, and trans-1,2-cyclohexane units is provided. The molar fraction of ethylene units in the copolymer is greater than or equal to 50%, relative to the total number of moles of ethylene, butadiene and trans-1,2-cyclohexane units. The microstructure of the copolymer is homogeneous. A process for preparing such a copolymer and also to the uses of this copolymer, in particular in rubber compositions for tires, is also provided.

20 Claims, 4 Drawing Sheets

ETHYLENE/BUTADIENE COPOLYMER OF HOMOGENEOUS MICROSTRUCTURE

This application is a 371 national phase entry of PCT/FR2016/053537 filed on 16 Dec. 2016, which claims benefit of French Patent Application No. 1562573, filed 17 Dec. 2015.

BACKGROUND

1. Technical Field

The present invention relates to the ethylene/butadiene copolymers for which the microstructure is controlled and homogeneous all along the chain of the copolymer. The present invention also relates to a process for preparing such a copolymer and also to the uses of this copolymer, in particular in rubber compositions for tyres.

2. Related Art

Copolymers based on ethylene and on conjugated diene have advantageous properties for a tyre application according to the characteristics of the intended materials, as described for example in patent applications WO 2014/082919 A1 or WO2014/114607 A1.

Another advantage of these copolymers is the use of ethylene which is a common and commercially available monomer, which is accessible via the fossil or biological route.

Another advantage of these copolymers is the presence of ethylene units along the polymer backbone, which units are much less sensitive to oxidizing or thermal/oxidizing degradation mechanisms, which confers better stability and lifetime on the materials.

The synthesis of copolymers based on ethylene and butadiene is described for example in U.S. Pat. No. 3,9101,862, EP 0 526 955 and WO 2004/035639. In application WO 2004/035639, the synthesis of copolymers based on ethylene and on conjugated diene makes it possible to obtain an ethylene-based elastomer with a low degree of crystallinity (less than 15%) despite the ethylene content greater than 70 mol %.

Industrial solution polymerization processes often consist of three major steps:

1) Preparation of the reaction mixtures;
2) Polymerization of the monomers in solution in contact with a catalytic system;
3) Recovery of the elastomer and recycling of the solvents, of the unreacted reagents and of the reaction by-products.

The preparation step 1) consists in preparing the solutions of monomers and of catalytic system for the subsequent introduction thereof into the reactor(s) of the polymerization step.

The polymerization step 2) consists in mixing the various solutions of monomers and of catalytic system in order to bring about the monomer polymerization reaction.

The recovery step 3) consists in separating the polymer from the solvents and from the unreacted chemical products (such as the monomers). The solvents and the unreacted chemical products are preferentially recycled to the preparation step. However, under certain conditions, recycling cannot be envisaged.

In the polymerization processes known to date, the microstructure of the copolymer obtained is set as it is or at best the average microstructure is controlled. However, this microstructure is not homogeneous all along the polymer chain and depends in particular on the way in which the polymerization was carried out and on the catalytic system reactivity ratios with respect to each of the monomers. A composition gradient is then observed due in particular to the fact that, for the existing catalytic systems, the ethylene and butadiene monomers have different speeds of insertion into the growing polymer chain.

SUMMARY

The invention relates particularly to copolymers based on ethylene and butadiene also comprising trans-1,2-cyclohexane units. Copolymers based on ethylene and butadiene comprising cyclohexane units are for example described in applications WO 2004/35639, EP 1 829 901 and WO 2004/035639. The copolymers obtained by means of the processes described in these applications exhibit not only an ethylene-unit and butadiene-unit concentration gradient, but also a trans-1,2-cyclohexane-unit concentration gradient.

Surprisingly, it has been discovered that it is possible to control the degree of incorporation of ethylene and butadiene and the homogeneity of the various units all along the chain so as to obtain copolymers with a low degree of crystallinity. The invention is directed towards ethylene/butadiene copolymers also comprising trans-1,2-cyclohexane units. The various units that can be found in these copolymers are ethylene units, butadiene units and trans-1,2-cyclohexane units.

A subject of the invention is novel ethylene/butadiene copolymers. Each ethylene/butadiene copolymer comprises, statistically distributed, ethylene units, butadiene units and trans-1,2-cyclohexane units, the molar fraction of ethylene units in said copolymer being greater than or equal to 50%, relative to the total number of moles of ethylene, butadiene and trans-1,2-cyclohexane units, characterized in that the microstructure of the copolymer is homogeneous and thus the molar concentration of each of the units is constant all along the chain of the copolymer.

The molar fraction of ethylene units advantageously ranges from 50 mol % to 95 mol %, relative to the total number of moles of ethylene, butadiene and trans-1,2-cyclohexane units.

The molar fraction of trans-1,2-cyclohexane units is advantageously between 0 mol % and 25 mol %, relative to the total number of moles of ethylene, butadiene and trans-1,2-cyclohexane units.

The ethylene/butadiene copolymer advantageously has a crystallinity of less than 20%, advantageously less than 10%.

Another subject of the invention is a semi-continuous process for preparing an ethylene/butadiene copolymer according to the invention, comprising the solution polymerization, in a hydrocarbon solvent, at a temperature of between 0° C. and 200° C., of ethylene and butadiene in the presence of a catalytic system allowing the formation of trans-1,2-cyclohexane cyclic units in the polymer chain, in a stirred reactor, characterized in that the polymerization is carried out at constant temperature and at constant ethylene pressure and constant butadiene pressure, in that the ethylene and butadiene are injected continuously into the reactor and in that, in the reaction medium, at each instant of polymerization, the ethylene and butadiene concentrations are constant.

In one variant, the composition of the reaction medium is continuously analysed and the ethylene and butadiene injection flow rates are adjusted so as to maintain, in the reaction medium, constant ethylene and butadiene concentrations.

The temperature is kept constant.

In another variant, the ethylene and butadiene injection flow rates are adjusted so as to maintain a constant ethylene pressure and a constant butadiene pressure in the reactor.

In particular, the ethylene and the butadiene are injected according to a predetermined flow ratio.

In particular, a composition comprising the ethylene and the butadiene at constant ethylene and butadiene concentrations is injected.

The catalytic system advantageously comprises at least two constituents; on the one hand, a metallocene corresponding to formula (I):

$$[P(Cp^1)(Cp^2)Met] \quad (I)$$

with:

Met being a group comprising:
- at least one scandium or yttrium atom or one atom of lanthanide, the atomic number of which ranges from 57 to 71,
- at least one monovalent ligand, belonging to the halogen group, such as chlorine, iodine, bromine or fluorine, or to the amide, alkyl or borohydride group,
- optionally other constituents, such as complexing molecules, belonging to the ether or amine group, P being a group, based on at least one silicon or carbon atom, bridging the two groups $Cp^1$ and $Cp^2$ $Cp^1$ and $Cp^2$ are identical to or different from one another, when $Cp^1$ and $Cp^2$ are identical to one another, they are selected from indenyls substituted in the 2 position, such as 2-methylindene, 2-phenylindene, from substituted or unsubstituted fluorenyls, such as fluorenyl, 2,7-di-tert-butylfluorenyl, 3,6-di-tert-butylfluorenyl, when $Cp^1$ and $Cp^2$ are different from one another, $Cp^1$ is selected from substituted or unsubstituted fluorenyls, such as fluorenyl, 2,7-di-tert-butylfluorenyl, 3,6-di-tert-butylfluorenyl, $Cp^2$ is selected from cyclopentadienyls substituted in the 2 and 5 positions, such as tetramethylcyclopentadiene, from indenyls substituted in the 2 position, such as 2-methylindene, 2-phenylindene, from substituted fluorenyls, such as 2,7-di-tert-butylfluorenyl, 3,6-di-tert-butylfluorenyl;

on the other hand, a co-catalyst which is an alkyl magnesium, an alkyl lithium, an alkyl aluminium, a Grignard reagent or a mixture of these constituents.

Another subject of the invention is an ethylene/butadiene copolymer obtained by means of the process according to the invention, characterized in that the microstructure of the copolymer is homogeneous.

Advantageously, the ethylene/butadiene copolymer according to the invention is an elastomer.

Another subject of the invention is a composition, in particular a rubber composition, comprising a copolymer according to the invention.

Another subject of the invention is a tyre, one of the constituent elements of which comprises a composition according to the invention.

In the present description, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

For the purposes of the present invention, the term "ethylene unit" denotes the units of formula —($CH_2$—$CH_2$)—.

For the purposes of the present invention, the term "butadiene unit" denotes the 1,4-units of formula —($CH_2$—CH=CH—$CH_2$)— and the 1,2-units of formula —($CH_2$—C(CH=$CH_2$))—. The 1,4-units of formula —($CH_2$—CH=CH—$CH_2$)— may be in trans or cis configuration.

For the purposes of the present invention, the term "trans-1,2-cyclohexane unit" denotes the units of formula:

For the purposes of the present invention, in the expression "significantly free of composition gradient", the term "significantly" is intended to mean a variation of less than 2 mol %.

For the purposes of the present invention, in the expression "the concentration is identical or almost identical to", the term "almost identical" is intended to mean a variation of less than 2 mol %.

For the purposes of the present invention, the "reaction medium" denotes the solution within the reactor.

For the purposes of the present invention, the expression "constant temperature" is intended to mean a variation in temperature of less than 5° C. within the reactor.

For the purposes of the present invention, the expression "ethylene pressure" denotes the partial pressure of ethylene within the reactor.

For the purposes of the present invention, the expression "butadiene pressure" denotes the partial pressure of butadiene within the reactor.

For the purposes of the present invention, the expression "monomer pressure" denotes the sum of the pressures that are the "ethylene pressure" and "butadiene pressure", that is to say the sum of the partial pressures of the monomers to be polymerized within the reactor.

The expression "pressure", with no other specific indication, indicates the total pressure within the reactor and is the result of the "ethylene pressure", the "butadiene pressure" and the contribution from the other constituents of the reaction medium, such as the solvent(s), or else the inert gas as appropriate (for example: nitrogen).

For the purposes of the present invention, the expression "constant pressure" is intended to mean a variation in pressure of less than 0.5 bar.

For the purposes of the present invention, the expression "constant ethylene and butadiene concentrations" is intended to mean variations of less than 0.1 mol/l.

BRIEF DESCRIPTION OF THE DRAWINGS

Meanings of the abbreviations used in these figures:
CIC: Concentration Indicator Controller
PIC: Pressure Indicator Controller
FI: Flow Indicator
FC: Flow Controller

DETAILED DESCRIPTION OF EXAMPLE EMBODIMENTS

A subject of the invention is an ethylene/butadiene copolymer comprising, statistically distributed, ethylene units, butadiene units and trans-1,2-cyclohexane units, the molar fraction of ethylene units in said copolymer being greater than or equal to 50%, relative to the total number of moles of ethylene, butadiene and trans-1,2-cyclohexane units, characterized in that the microstructure of the copolymer is homogeneous.

A copolymer is of homogeneous microstructure when, for each of these units, at each instant of polymerization, the concentrations in the chain are identical or almost identical. Thus, for each of these units, at a given instant, the concentration is identical or almost identical to its concentration at the instant just before and after, and thus at any instant of the polymerization.

In particular, in the ethylene/butadiene copolymer, the molar concentration of each of these units is constant all along the chain of the copolymer. Thus, for a representative number of successive units defining a segment, present at the beginning, middle or end or at any other place of the chain of the copolymer, the concentration of ethylene units, butadiene units and trans-1,2-cyclohexane units is identical or almost identical in each segment. A sequence of 10 units may be a representative number.

Advantageously, the concentration of ethylene units, of butadiene units and of trans-1,2-cyclohexane units is identical or almost identical all along the chain of the copolymer. It will be possible to determine the concentration of each of the units in advance according to the nature of the catalytic system selected and to the operating conditions (monomer concentrations and pressure in particular).

Contrary to the copolymers synthesized up until now, no over-concentration of one of these units is observed, in particular at the chain beginning or chain end. In other words, the microstructure is free or significantly free of composition gradient.

Surprisingly, and highly advantageously, the control of the microstructure of the copolymer makes it possible to obtain copolymers having low degrees of crystallinity even though the molar concentration of ethylene units is very high. Thus, it is possible to obtain copolymers comprising high contents of ethylene units and having a limited degree of crystallinity.

In the copolymer according to the invention, the molar fraction of ethylene units, relative to the total number of moles of ethylene, butadiene and trans-1,2-cyclohexane units, is greater than or equal to 50 mol %. It advantageously ranges from 50 mol % to 99 mol %, more advantageously from 50 mol % to 90 mol %, even more advantageously from 65 mol % to 80 mol %, relative to the total number of moles of ethylene, butadiene and trans-1,2-cyclohexane units.

Indeed, it is, by virtue of the present invention, possible to obtain copolymers having a high molar concentration of ethylene units while at the same time having a low crystallinity.

Advantageously, the ethylene/butadiene copolymer according to the invention has a crystallinity of less than 25%, more advantageously less than 15%, even more advantageously less than 10%.

According to one particularly advantageous example of implementation of the invention, in the ethylene/butadiene copolymer, the molar fraction of butadiene units, relative to the total number of moles of ethylene, butadiene and trans-1,2-cyclohexane units, in said copolymer, is less than 50 mol %. The molar fraction of butadiene units advantageously ranges from 1 mol % to 35 mol %, relative to the total number of moles of ethylene, butadiene and trans-1,2-cyclohexane units.

The butadiene units denote the 1,4-units of formula —($CH_2$—CH=CH—$CH_2$)—, of trans or cis configuration, and the 1,2-units of formula —($CH_2$—C(CH=$CH_2$))—. The concentration of each of these units will also be constant all along the chain of the copolymer. It will also be possible to determine it in advance according to the nature of the catalytic system selected and to the operating conditions (monomer concentrations and pressure in particular).

Preferably, the copolymers according to the invention are such that they comprise trans-1,2-cyclohexane units, originating from an insertion of butadiene and of ethylene, according to a molar fraction greater than 0% and, even more preferentially, greater than or equal to 1%, relative to the total number of moles of ethylene, butadiene and trans-1,2-cyclohexane units.

According to one example of implementation of the invention, in the ethylene/butadiene copolymer, the molar fraction of the trans-1,2-cyclohexane units is between 0% and 25%, and advantageously ranges from 1% to 10%, relative to the total number of moles of ethylene, butadiene and trans-1,2-cyclohexane units.

According to another example of implementation of the invention, in the ethylene/butadiene copolymer, the molar fraction of the trans-1,2-cyclohexane units is between 0% and 25%, and advantageously is greater than 0% and less than or equal to 5%, relative to the total number of moles of ethylene, butadiene and trans-1,2-cyclohexane units.

For a given catalytic system, the relative concentration of each of the units is dependent on the concentration of monomers in the reaction medium, and therefore is dependent on the operating conditions in the reactor, in particular the ethylene pressure, the butadiene pressure and the monomer pressure within the reactor. Thus, independently of the reactivity ratios of the monomers with respect to the catalytic system used, the molar fractions of each of the units can be adjusted by the conditions for carrying out the polymerization.

Advantageously, the ethylene/butadiene copolymers according to the invention have a weight Mn ranging from 1000 g/mol to 1 500 000 g/mol, more preferentially ranging from 60 000 g/mol to 250 000 g/mol.

According to another characteristic of the invention, the copolymers according to the invention have a polydispersity index which is less than 2.5. Preferably, the Ip index of said copolymers is less than or equal to 2 and, even more preferentially, this Ip index is less than or equal to 1.9. Like the molecular weights Mn, the polydispersity indices Ip have been determined in the present application by size exclusion chromatography (SEC technique described before the examples).

The copolymers according to the invention preferably have a glass transition temperature Tg which is less than 25° C. More specifically, these copolymers can for example have a temperature Tg of between −45° C. and −20° C.

The copolymers according to the invention are advantageously elastomers.

Another subject of the invention is a semi-continuous process for preparing an ethylene/butadiene copolymer according to the invention, comprising the solution polymerization, in a hydrocarbon solvent, at a temperature of between 0° C. and 200° C., advantageously between 0° C. and 120° C., of ethylene and butadiene in the presence of a catalytic system allowing the formation of trans-1,2-cyclohexane units in the polymer chain, in a reactor, characterized in that the polymerization is carried out at constant temperature, at constant ethylene pressure and constant butadiene pressure, in that the ethylene and butadiene are injected continuously and in a controlled manner into the reactor and in that, in the reaction medium, at each instant of polymerization, the ethylene and butadiene concentrations are kept constant.

The reactor is equipped with stirring means.

The process according to the invention is thus a controlled process, for which the amounts of ethylene and butadiene introduced, which are defined in particular as a function of the catalytic system selected and of the desired microstructure, are controlled. This control makes it possible both to define the microstructure of the polymer synthesized, and also to define and keep constant the ethylene pressure and the butadiene pressure.

The polymerization step is advantageously carried out according to a semi-continuous process in solution in the presence of a catalytic system allowing the formation of trans-1,2-cyclohexane units with a continuous injection of the co-monomers, ethylene and butadiene, in a stirred reactor so as to obtain a copolymer of homogeneous and statistical composition all along the chain.

The specific control of the co-monomer injection makes it possible to control the degree of incorporation of ethylene and butadiene and the homogeneity of the microstructure, thus making it possible to obtain copolymers with a low degree of crystallinity.

The catalytic system advantageously comprises at least two constituents; on the one hand, a metallocene corresponding to formula (I):

[P(Cp$^1$)(Cp$^2$)Met]           (I)

with:

Met being a group comprising:
at least one scandium or yttrium atom or one atom of lanthanide, the atomic number of which ranges from 57 to 71,
at least one monovalent ligand, belonging to the halogen group, such as chlorine, iodine, bromine or fluorine, or to the amide, alkyl or borohydride group,
optionally other constituents, such as complexing molecules, belonging to the ether or amine group,
P being a group, based on at least one silicon or carbon atom, bridging the two groups Cp$^1$ and Cp$^2$
Cp$^1$ and Cp$^2$ are identical to or different from one another,
when Cp$^1$ and Cp$^2$ are identical to one another, they are selected from indenyls substituted in the 2 position, such as 2-methylindene, 2-phenylindene, from substituted or unsubstituted fluorenyls, such as fluorenyl, 2,7-di-tert-butylfluorenyl, 3,6-di-tert-butylfluorenyl,
when Cp$^1$ and Cp$^2$ are different from one another, Cp$^1$ is selected from substituted or unsubstituted fluorenyls, such as fluorenyl, 2,7-di-tert-butylfluorenyl, 3,6-di-tert-butylfluorenyl, Cp$^2$ is selected from cyclopentadienyls substituted in the 2 and 5 positions, such as tetramethylcyclopentadiene, from indenyls substituted in the 2 position, such as 2-methylindene, 2-phenylindene, from substituted fluorenyls, such as 2,7-di-tert-butylfluorenyl, 3,6-di-tert-butylfluorenyl;

on the other hand, a co-catalyst which is an alkyl magnesium, an alkyl lithium, an alkyl aluminium, a Grignard reagent or a mixture of these constituents.

By way of substituted cyclopentadienyl, fluorenyl and indenyl groups, mention may be made of those which are substituted with alkyl radicals having 1 to 6 carbon atoms or with aryl radicals having 6 to 12 carbon atoms. The choice of the radicals is also guided by the accessibility to the corresponding molecules, which are the substituted cyclopentadienes, fluorenes and indenes, because the latter are commercially available or can be easily synthesized.

In the present patent application, in the case of the cyclopentadienyl group, the 2 (or 5) position denotes the position of the carbon atom which is adjacent to the carbon atom to which the bridging group P is attached, as is represented in the diagram below.

Mention may more particularly be made, as cyclopentadienyl group substituted in the 2 and 5 positions, of the tetramethylcyclopentadienyl group.

In the case of the indenyl group, the 2 position denotes the position of the carbon atom which is adjacent to the carbon atom to which the bridging group P is attached, as is represented in the diagram below.

Mention may more particularly be made, as indenyl groups substituted in the 2 position, of 2-methylindenyl or 2-phenylindenyl.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings as represented in the scheme below, the 9 position corresponding to the carbon atom to which the bridging group P is attached.

Advantageously, the metallocene is a lanthanide metallocene. Preferentially, the lanthanide metallocene is selected from the compounds [Me$_2$Si(Flu)$_2$Nd(BH$_4$)$_2$Li(THF)], [Me$_2$Si(Flu)$_2$Nd(BH$_4$)(THF)], [Me$_2$Si(2-MeInd)$_2$Nd(BH$_4$)], [Me$_2$Si(CsMe$_4$)(Flu)Nd(BH$_4$)], [Me$_2$Si(2-MeInd)(Flu)Nd(BH$_4$)] and the co-catalyst is selected from dialkyl magnesium compounds such as ethyl butyl magnesium or butyl octyl magnesium.

The symbol "Flu" represents the fluorenyl group in C$_{13}$H$_8$ and the symbol "MeInd" represents an indenyl group substituted in the 2 position with a methyl.

Such systems have for example been described in applications WO 2004/035639 and WO 2007/054224.

Optionally, the catalytic system can comprise other constituents, selected from ethers, aliphatic solvents, or other compounds known to those skilled in the art and compatible with such catalytic systems.

The reaction for solution polymerization of ethylene and butadiene is carried out in one or more reactors in parallel. When several reactors according to the invention are in parallel, the management of the timing can be adjusted according to the manufacturing requirements and in a manner consistent with the prior step of preparing the reagents and the subsequent step of recovering the polymer.

Each reactor must ensure an optimal level of mixing between the gas phase and the liquid phase. By way of example, mention may be made of the internal stirring modules of hollow rod type and/or the modules for recirculation of the gas phase via an external loop with injection into the liquid phase.

It is preferable to use reactors which make it possible to hold and control at least 15 bar of pressure, preferentially at least 200 bar of pressure. Indeed, the ethylene pressure and the butadiene pressure must be constant, throughout the polymerization, in order to guarantee a homogeneous microstructure all along the polymer chain, and also the expected productivity levels.

It is also preferable to use reactors with an efficient temperature control device; for example, a jacket, an internal condenser in the gas phase, a heat exchanger in the liquid phase, a cooler in the external gas recirculation loop.

The polymerization temperature is advantageously between 0° C. and 200° C., more advantageously between 0° C. and 120° C. The polymerization temperature is selected according to the catalytic system and to the product to be obtained. The temperature, which has an influence on the macrostructure and the microstructure, is also controlled in order to keep it constant, throughout the polymerization phase, in the selected range.

The ethylene pressure, which is constant during the polymerization step, may advantageously range from 1 to 100 bar. The butadiene pressure, which is constant during the polymerization step, may advantageously range from 1 to 100 bar. In particular, it has been noted that the relative concentration of the various units can also be controlled by the ethylene pressure and the butadiene pressure.

In a first variant, the monomer pressure ranges from 1 to 25 bar, more advantageously from 4 to 25 bar, and the copolymer comprises trans-1,2-cyclohexane units in a molar fraction of between 0% and 25%, more advantageously ranging from 1% to 10%, relative to the total number of moles of ethylene, butadiene and trans-1,2-cyclohexane units.

In another variant, the monomer pressure ranges from 25 to 100 bar, more advantageously from 25 to 80 bar, and the copolymer comprises trans-1,2-cyclohexane units in a molar fraction of between 0% and 25%, more advantageously greater than 0% and less than or equal to 5%, relative to the total number of moles of ethylene, butadiene and trans-1,2-cyclohexane units.

According to the invention, a monomer injection management system is coupled to the reactor in order to keep constant the ethylene pressure and the butadiene pressure and thus to guarantee a random polymer free of composition gradient all along the chain.

In a first mode of operation, this monomer injection control system can consist of a means for measuring the ethylene concentration in the reaction medium and of a means for measuring the butadiene concentration in the reaction medium. Consequently, the injection flow rates of each of the two monomers are adjusted according to the reaction medium composition measurement. These adjustments are made in order to ensure a constant ethylene and butadiene concentration at the setpoint in the reaction medium.

Thus, in this first mode of operation, the composition of the reaction medium is continuously analysed and the ethylene and butadiene injection flow rates are adjusted so as to maintain, in the reaction medium, constant ethylene and butadiene concentrations.

In this mode of operation, the temperature is kept constant throughout the polymerization phase.

In this mode of operation, the butadiene is advantageously injected in liquid form.

In this mode of operation, the ethylene is advantageously injected in gas form.

By way of non-limiting example, the measuring means can be carried out using methods of absorbance type in the infrared range, or methods of absorbance type in the ultraviolet/visible range, or using gas chromatography.

Figure 1:
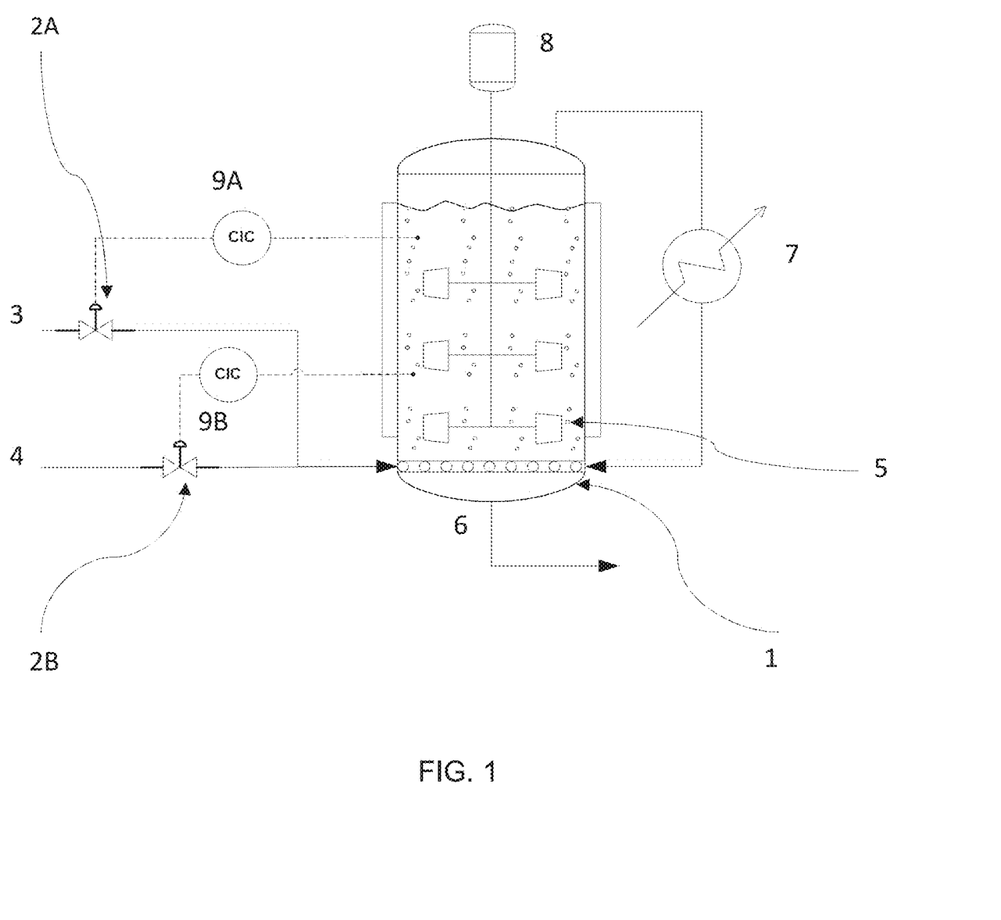
FIG. 1: schematic diagram for a polymerization according to the first mode of operation of the invention.

An example of a reactor according to this first mode of operation is represented in FIG. 1, the solvent-feed and catalytic-system-feed pipes not being represented.

1. Reactor
2A and 2B. Flow regulator valves
3. Ethylene feed pipe
4. Butadiene feed pipe
5. Stirring means
6. Reactor emptying pipe
7. External cooling of the reactor
8. Stirring means drive motor
9A and 9B. Automatic controllers for controlling the ethylene and butadiene concentration in the reaction medium The reactor 1 comprises means for measuring (not represented) the ethylene concentration and the butadiene concentration in the reaction medium, which are connected to an automatic controller for controlling the ethylene and butadiene concentration, respectively 9A and 9B, servo-controlling the respective injection flow rates of the ethylene fed by a pipe 3 and the butadiene fed by a pipe 4 by controlling the valves 2A and 2B. The reactor comprises stirring means 5, in this case several blades. The temperature within the reactor is kept constant throughout the polymerization phase.

In a second mode of operation, the ethylene and butadiene injection flow rate is continuous and is adjusted so as to maintain a constant ethylene pressure and a constant butadiene pressure in the reactor.

In this mode of operation, the temperature is kept constant throughout the polymerization phase.

In this mode of operation, the ethylene concentration in the reaction medium is kept constant by managing the pressure within the reactor with a continuous addition of ethylene. Specifically, the ethylene consumption is compensated for by keeping the ethylene pressure constant within the reactor and by continuously injecting ethylene, at a flow rate that can vary. The same is true for the butadiene.

In a first variant, the ethylene and the butadiene are injected according to a predetermined flow ratio. Thus, the injection of the monomers is controlled by the ethylene pressure and the butadiene pressure of the reactor and by a flow ratio that is known by virtue of the various tools available to those skilled in the art (experimentation, digital simulation), and suitable for the catalytic system used.

Figure 2:
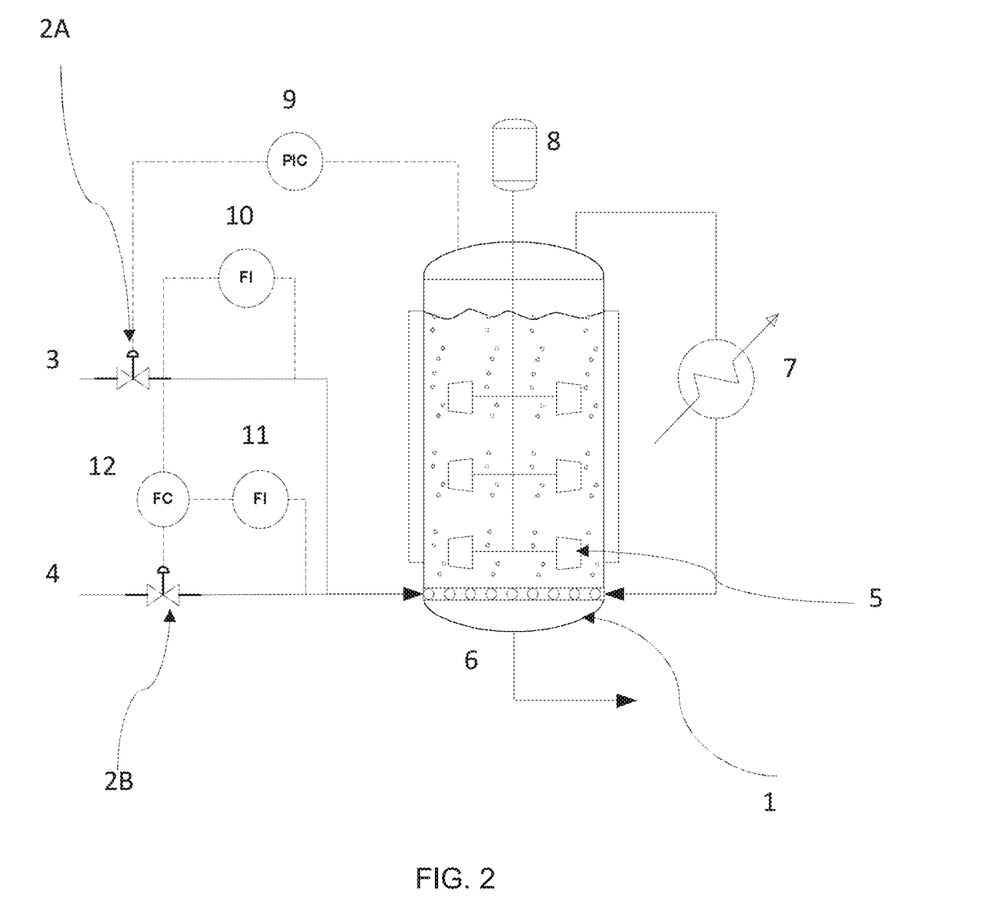
FIG. 2: schematic diagram for a polymerization according to the second mode of operation, first variant, of the invention.

An example of a reactor according to this first mode of operation is represented in FIG. 2, the solvent-feed and catalytic-system-feed pipes not being represented.

1 Reactor
2A and 2B Flow regulator valves
3 Ethylene feed pipe
4 Butadiene feed pipe
5 Stirring means
6 Reactor emptying pipe
7 External cooling of the reactor
8 Stirring means drive motor
9 Automatic reactor pressure controller
10 and 11 Means for measuring flow rate
12 Ethylene and butadiene feed flow ratio controller In this mode of operation, the butadiene is advantageously injected in liquid form.

In this mode of operation, the ethylene is advantageously injected in gas form.

The reactor 1 comprises a means for measuring the pressure (not represented) within the reactor, which is connected to an automatic controller for controlling the pressure of the reactor 9, which servo-controls the ethylene and butadiene injection flow rates, respectively fed by a pipe 3 and a pipe 4. The ethylene and butadiene pressures are kept constant by keeping the total pressure constant within the reactor. The ethylene and butadiene injection flow rates, regulated by opening the respective valves 2A and 2B and measured respectively by flow rate measuring means 10 and 11, are moreover controlled by a controller of the ratio of the ethylene and butadiene feed flow rates 12 so as to adhere to the preestablished flow ratio. The reactor comprises stirring means 5, in this case several blades. The temperature within the reactor is kept constant throughout the polymerization phase.

In a second variant, a composition comprising the ethylene and the butadiene at constant ethylene and butadiene concentrations is injected.

Figure 3:
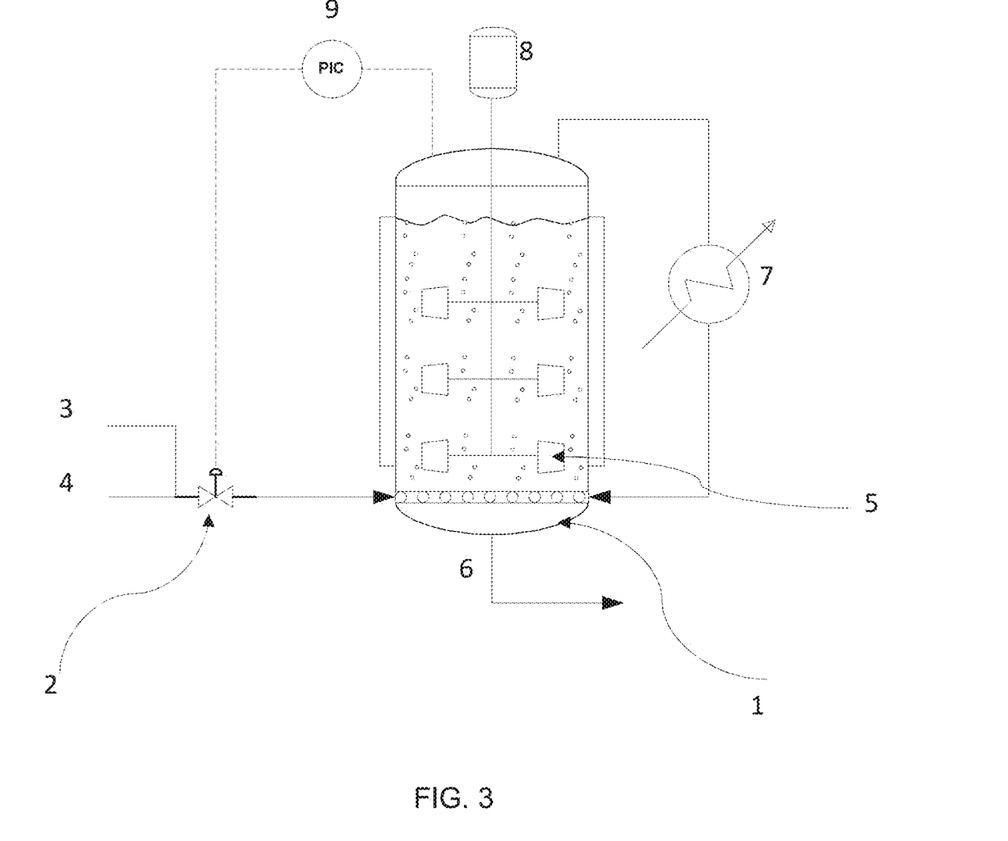
FIG. 3: schematic diagram for a polymerization according to the second mode of operation, second variant, of the invention.

An example of a reactor according to this first mode of operation is represented in FIG. 3, the solvent-feed and catalytic-system-feed pipes not being represented.

1. Reactor
2. Flow regulator valve
3. Ethylene feed pipe
4. Butadiene feed pipe
5. Stirring means
6. Emptying pipe
7. External cooling
8. Stirrer spindle drive motor
9. Automatic reactor pressure controller The reactor 1 comprises a means for measuring the pressure (not represented) within the reactor, which is connected to an automatic controller for controlling the pressure of the reactor 9, which servo-controls the ethylene/butadiene pre-mixture injection flow rate by means of a valve 2, the ethylene and the butadiene being respectively fed by a pipe 3 and a pipe 4. The ethylene and butadiene pressures are kept constant by keeping the total pressure constant within the reactor. The reactor comprises stirring means 5, in this case several blades. The temperature within the reactor is kept constant throughout the polymerization phase.

In this mode of operation, the butadiene/ethylene mixture is advantageously injected in liquid or supercritical form. Indeed, the injection can be at pressures that are sufficiently high, in particular from 52 to 250 bar, more advantageously from 60 to 100 bar, and temperatures that are sufficiently low, in particular from 0 to 50° C., more advantageously from 5 to 25° C., so as to have a liquid mixture with the aim of adjusting the injection conditions to the existing techniques.

The solution polymerization process generally comprises three major steps:
Step 1: preparation step
Step 2: polymerization step
Step 3: polymer recovery step.
Step 1:
The objective of step 1 is to:
Purify the (ethylene and butadiene) monomers and the solvent if necessary
Prepare the catalytic system solution.

The techniques for purifying the monomers and solvent depend on the nature of the impurities and the content thereof. By way of non-limiting example, it may be mentioned that distillation or chemical adsorption techniques can be envisaged for purifying the monomers or solvent.

Some examples that may be mentioned as solvent include $C_2$ to $C_{30}$ alkanes, branched $C_4$ to $C_{30}$ alkanes, cyclic $C_5$-$C_6$ alkanes, branched cyclic $C_6$-$C_{30}$ alkanes, $C_6$-$C_{30}$ aromatic solvents and mixtures of these products.

The preparation of the catalytic system solution is a difficult step since this type of catalytic system does not withstand the presence of air or of protic products, such as water or alcohols. The preparation is carried out with the polymerization solvent that has been purified and/or recycled from the process.

Step 2:
Step 2 comprises the polymerization reaction as previously described.

Before the production phase, the reactor or reactors must be cleaned so that the level of impurities present in the reactor is less than or equal to the level of impurities tolerated by the catalytic system.

By way of example, the reactor can be washed with the solvent purified in step 1 and the level of impurities can be measured on the washing solvent.

In another additional or replacement mode, the reactor impurities that are harmful to the polymerization are neutralized by washing with a solution of alkyl aluminium or alkyl magnesium. It is then said that the reactor is made inert.

The production timing is initiated after the cleaning phase. The timing which makes it possible to obtain the copolymer according to the invention is advantageously divided into three phases:
Phase 1) charging of the reactor
Phase 1) begins with the selected amount of solvent or of solvent mixture being charged to the reactor. This phase is preferably carried out under an inert atmosphere, at the intended reaction temperature and with the mixing system(s) according to the desired regime.

The monomers are then introduced while at the same time adhering to the composition desired for the medium. The monomer introduction ends when the pressure of the reactor reaches the desired pressure.

Phase 1 is finished when the solvents and the monomers are in the reactor at the desired pressure, temperature and monomer composition.

Phase 2) polymerization

Phase 2) begins with the injection of the catalytic system solution into the reactor, in a desired amount.

The polymerization phase continues with a continuous feed of the monomers according to one of the modes previously described.

In order to obtain the desired product, it is essential to control the temperature and to keep the ethylene pressure and the butadiene pressure constant.

The phase-2 cycle ends once the desired conversion of monomers is achieved. The corresponding polymerization time is determined by the various tools available to those skilled in the art (experimentation, digital simulation), and adapted to the catalytic system and to the experimental conditions used.

Phase 3) discharging and stopping of the polymerization

Phase 3 consists in emptying the polymerization reactor. At the time the reactor is emptied, the polymer solution is mixed with a stopper in order to stop the polymerization reaction and to deactivate the catalytic system. This stopper may be an alcohol or any other chemical compound which results in the deactivation of the catalytic system. The stopping of the reaction can be carried out in the reactor or outside (other reactor, tube, etc.).

Once phase 3) has finished, the polymerization step is over.

Step 3:

Step 3) consists in:

- recovering the polymer from the solution and separating it from its solvent according to any method known to those skilled in the art, so as to isolate and to bring it to a volatile substance content of less than 1% by weight,
- recovering the solvent and the unconverted monomers and recycling them completely or partly to step 1) if purification is required, or completely or partly to step 2) if purification is not required.

For this, mention may be made, in a non-limiting manner, of several recovery techniques known to those skilled in the art, such as:

Separation by settling out, if two liquid phases can form under the separation conditions. One of the phases is rich in polymer, the other in solvent and in unreacted monomers. This technique may be possible if the mixture of solvent, monomers and polymer allows it, and advantageous from an energy point of view. This technique is often present after step 2);

Flash, which consists in separating, by devolatilization, the solvent and the unconverted monomers from the polymer by a thermal effect or by the effect of a pressure reduction, or both. This technique is often present after step 2) or the separating by settling out;

Stripping, which consists in separating the solvent and the unconverted monomers from the polymer through the presence of a third inert substance such as nitrogen or steam. This step can be coupled with a thermal effect in order to improve the recovery of the polymer. This technique is often present after the flash devolatilization;

Press-drying, which consists in pressing elastomer particles in order to extract the liquid constituents contained inside the elastomer particles. This technique is often present after a stripping step;

Extrusion/flash, which consists in compressing the polymer at high pressures and at sufficiently high temperatures to subsequently perform an expansion by flash. This makes it possible to devolatilize almost all of the solvent residues and unconverted monomer residues. This technique is often present after a press-drying step or the flash step;

Drying with a fluid, preferably hot fluid, which makes it possible to remove the solvent residues and unconverted monomer residues in the polymer. This technique is often present after a press-drying step or the flash step.

In one preferential mode of operation, the recovery of the polymer from the polymer solution is carried out by:

1 Concentration in a succession of flash steps in order to obtain a polymer solution concentrated to at least 15% by weight, preferentially to at least 20% by weight, and an impurity-free solvent and unconverted-monomer gas stream. This stream can be recycled to step 2).

2 Steam-stripping in order to obtain the polymer with a hydrocarbon (solvents and unconverted monomers) content of less than 5% by weight, preferentially less than 1% by weight. The gas stream rich in solvent, in unconverted monomers and in steam is sent to step 1) in order to be purified by separation by settling out, distillation and/or chemical adsorption. The polymer flow after this step is composed of water and polymer particles saturated with water and less than 1% by weight of hydrocarbons.

3 Filtration of the polymer particles and then press-drying in order to reduce the volatile substance (hydrocarbons and water) content to less than 5% by weight, preferably to less than 3% by weight of volatile substances.

4 Compression at more than 50 bar, heating at less than 250° C., extrusion and flash at atmospheric pressure in order to reduce the volatile substance content to less than 1% by weight.

5 Drying in hot dry air (~80° C.) in order to achieve the specification in terms of volatile substance content, usually less than 0.5% by weight.

Another subject of the invention is the copolymer obtained by means of the process according to the invention. This copolymer is advantageously an elastomer.

Compositions

Another subject of the invention is a composition comprising a copolymer according to the invention, preferably an elastomer.

The composition is advantageously a rubber composition, in particular a composition of use in the manufacture of a tyre.

According to one advantageous variant of the invention, the copolymer according to the invention is an elastomer. The copolymer according to the invention is particularly useful for preparing compositions as described in patent WO 2014/082919 A1 or WO 2014/114607 A1 in the name of the Applicants. If optional other elastomers are used in the composition, the copolymer according to the invention constitutes the predominant fraction by weight of all the elastomers; it then represents at least 65%, preferably at least 70% by weight, more preferentially at least 75% by weight of all the elastomers present in the elastomer composition. Preferentially likewise, the copolymer according to the invention represents at least 95% (in particular 100%) by weight of all the elastomers present in the composition. Thus, the amount of copolymer according to the invention is within a range which varies from 65 to 100 phr (parts by weight per 100 parts of total elastomer), preferentially from 70 to 100 phr and in particular from 75 to 100 phr. Preferentially likewise, the composition contains from 95 to 100 phr of copolymer according to the invention.

The composition according to the invention may also comprise at least one (that is to say one or more) diene rubber as non-thermoplastic elastomer.

The term "diene" elastomer or rubber should be understood, in a known way, to mean an (one or more is understood) elastomer resulting at least in part (i.e., a homopolymer or a copolymer) from diene monomers (monomers bearing two conjugated or non-conjugated carbon-carbon double bonds).

Diene elastomer should be understood, according to the invention, as meaning any synthetic elastomer resulting, at least in part, from diene monomers. More particularly, diene elastomer is understood as meaning any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter contain from 20% to 99% by weight of diene units and from 1% to 80% by weight of vinylaromatic units. The following are especially suitable as conjugated dienes that may be used in the process in accordance with the invention: 1,3-butadiene, 2-methyl-1,3-butadiene, 2,3-di(C1 to C5 alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene or 2,4-hexadiene, etc.

The diene elastomer of the composition in accordance with the invention is preferably selected from the group of diene elastomers consisting of polybutadienes, synthetic polyisoprenes, natural rubber, butadiene copolymers, isoprene copolymers and the mixtures of these elastomers. Such copolymers are more preferentially selected from the group consisting of styrene copolymers (SBR, SIR and SBIR), polybutadienes (BR), synthetic polyisoprenes (IR) and natural rubber (NR).

Reinforcing Filler

When a reinforcing filler is used, use may be made of any type of filler commonly used for the manufacture of tyres, for example an organic filler, such as carbon black, an inorganic filler capable of reinforcing by itself, without any means other than an intermediate coupling agent, such as silica, or else a blend of these two types of filler, in particular a blend of carbon black and silica.

In order to couple the reinforcing inorganic filler to the elastomer, use is made, in a known manner, of an at least bifunctional coupling agent (or bonding agent) intended to provide a satisfactory connection, of chemical and/or physical nature, between the inorganic filler (surface of the particles or of the particle aggregates) and the elastomer according to the invention, in particular bifunctional organosilanes or polyorganosiloxanes.

Various Additives

The rubber compositions in accordance with the invention can also comprise all or a portion of the normal additives customarily used in elastomer compositions intended for the manufacture of tyres, such as, for example, pigments, protective agents, such as antiozone waxes, chemical antiozonants or antioxidants, antifatigue agents, reinforcing or plasticizing resins, methylene acceptors (for example, phenolic novolak resin) or methylene donors (for example, HMT or H3M), such as described, for example, in application WO 02/10269, a crosslinking system based either on sulfur or on sulfur donors and/or on peroxide and/or on bismaleimides, vulcanization accelerators, vulcanization activators, adhesion promoters, such as cobalt-based compounds, preferably non-aromatic or very slightly aromatic plasticizing agents selected from the group consisting of naphthenic oils, paraffinic oils, MES oils, TDAE oils, ether plasticizers, ester plasticizers (for example glycerol trioleates), hydrocarbon resins exhibiting a high Tg, preferably of greater than 30° C., such as described, for example, in applications WO 2005/087859, WO 2006/061064 and WO 2007/017060, and the mixtures of such compounds.

Another subject of the invention is a tyre, one of the constituent elements of which comprises a composition according to the invention.

The abovementioned characteristics of the present invention, and also others, will be better understood on reading the following description of several exemplary embodiments of the invention, given by way of illustration and without limitation, in relation to the appendices.

Measurements and Tests Used

DETERMINATION OF THE MOLAR MASSES: Size Exclusion Chromatography analysis of the copolymers:

a) For the copolymers soluble at ambient temperature in tetrahydrofuran (THF), the molar masses were determined by size exclusion chromatography in THF. The samples were injected using a Waters 717 injector and a Waters 515 HPLC pump at a flow rate of 1 ml·min$^{-1}$ in a series of Polymer Laboratories columns.

This series of columns, placed in a thermostatic chamber at 45° C. is composed of:

one PL Gel 5 µm precolumn,
two PL Gel 5 µm Mixte C columns,
one PL Gel 5 µm-500 Å column.

The detection was carried out using a Waters 410 refractometer.

The molar masses were determined by universal calibration using polystyrene standards certified by Polymer Laboratories and a double detection with refractometer and coupling to the viscosity metre.

Without being an absolute method, SEC makes it possible to comprehend the distribution of the molecular weights of a polymer. On the basis of standard commercial products of polystyrene type, the various number-average weights (Mn) and weight-average weight (Mw) can be determined and the polydispersity index calculated (Ip=Mw/Mn);

b) For the copolymers insoluble at ambient temperature in tetrahydrofuran, the molar masses were determined in 1,2,4-trichlorobenzene. They were first dissolved under hot conditions (4 h 00 at 150° C.), then they were injected at 150° C., with a flow rate of 1 ml·min$^{-1}$, into a Waters Alliance GPCV 2000 chromatograph equipped with three Styragel columns (two HT6E columns and one HT2 column).

The detection was carried out using a Waters refractometer.

The molar masses were determined by relative calibration using polystyrene standards certified by Polymer Laboratories.

Determination of the Molar Fractions

Reference will be made to the article "Investigation of ethylene/butadiene copolymers microstructure by $^1$H and $^{13}$C NMR, Llauro M. F., Monnet C., Barbotin F., Monteil V., Spitz R., Boisson C., Macromolecules 2001, 34, 6304-6311", for a detailed description of the $^1$H NMR and $^{13}$C NMR techniques which were precisely used in the present application to determine the molar fractions of these trans-1,2 cyclohexane units, and also the ethylene, 1,4-cis butadiene and 1,4-trans butadiene units.

Determination of the Crystallinity

The crystallinity measurement was carried out by comparison of the enthalpy of fusion observed in the case of EBRs. This endothermic phenomenon is observed during the analysis of the thermogram of the DSC (Differential Scanning Calorimetry) measurement. The measurement is carried out by back-and-forth scanning from −150° C. to 200° C. under an inert (helium) atmosphere with a gradient of 20° C./min.

The signal corresponding to the endothermic (fusion) phenomenon is integrated and the degree of crystallinity is the ratio of the enthalpy measured to that of perfectly crystalline polyethylene (290 J/g).

% Crystallinity=(Enthalpy measured in J/g)/(theoretical enthalpy of a 100% crystalline polyethylene in J/g)

Determination of the Glass Transition Temperature

The glass transition temperature, Tg, is measured in the present application by the DSC (Differential Scanning Calorimetry) technique on a Setaram DSC 131 apparatus. The temperature program used corresponds to a temperature increase from −120° C. to 150° C. at a rate of 10° C./min. Reference may be made to the method described in application WO 2007/054224 (page 11).

EXAMPLES

The series of examples below is intended to illustrate some embodiments of the invention, which result in the obtaining of a homogeneous distribution of the various constituent units of ethylene/butadiene copolymers.

A first series of experimental examples illustrates the homogeneous distribution of the units during the polymerization, characterized by an analysis of the copolymer composition throughout the polymerization A second series of experimental examples shows that, according to the invention, the homogeneous distribution of the units along the polymer chain can significantly shift the compromise of degree of crystallinity as a function of the molar percentage of ethylene units.

A final series of examples obtained by digital simulation shows the capacity to obtain a homogeneous distribution of the various constituent units of ethylene/butadiene copolymers under various operating conditions, in particular at higher molar concentration of monomers in the reaction medium, and describes the composition of the copolymers accessible according to the invention.

In the tables, the following abbreviations are used:
E.=ethylene unit
B.=butadiene unit
B. 1,4=1,4-trans or 1,4-cis butadiene unit
B. 1,2=1,2-butadiene unit
C.=trans-1,2-cyclohexane unit The percentages of the units are molar percentages, relative to the total number of moles of ethylene, butadiene and trans-1,2-cyclohexane units.

Examples—Part A

This part illustrates the copolymerization of ethylene and butadiene in a reactor with a working volume of 87.5 l. Two monomer addition management modes are envisaged, with or without drift of the composition, for two types of monomer mixtures, as illustrated in the table below.

TABLE 1

| | Butadiene monomer composition (mol %) | Control of the composition |
|---|---|---|
| Counterexample 1 (C-EX 1) | 20% | Drifting |
| Counterexample 2 (C-EX 2) | 30% | Drifting |
| Example 1 (EX 1) | 20% | Controlled, according to the invention |
| Example 2 (EX 2) | 30% | Controlled, according to the invention |

Butadiene monomer composition (mol %)=total molar percentage of butadiene introduced (phase 1+2), relative to the total number of moles of monomers introduced (butadiene+ethylene, phases 1+2).

The procedure for these four examples comprises the following steps:
1. Phase 1: charging of the reactor. The products below are introduced, in the amounts indicated in Table A-1, into an inert stirred reactor:
   toluene (solvent),
   solution of Butyl-Octyl-Magnesium (BOMag) in toluene, used here to neutralize the reactor impurities,
   ethylene,
   optionally butadiene.

All these introductions are carried out at atmospheric pressure, under a nitrogen inert atmosphere and at ambient temperature. Once this phase has ended, the total pressure of the reactor is 8.5 bar.

2. Phase 2: polymerization

The catalytic system, consisting of metallocene [Me$_2$Si(Flu)$_2$Nd(BH$_4$)$_2$Li(THF)] and of the alkylating agent BOMag are introduced at atmospheric pressure, under a nitrogen inert atmosphere and at ambient temperature. In table A1, these amounts are constant and equivalent for all the Counterexamples C-EX 1 and 2, and the Examples EX1 and EX2. These amounts can be determined by those skilled in the art according to the desired characteristics of the polymers to be synthesized.

At this time, the temperature control system is adjusted in order to keep the reaction medium at 80° C., and the polymerization begins and continues until the desired monomer conversion is achieved.

The examples differ from the counterexamples in terms of
(i) a mode of batchwise addition of butadiene and continuous addition of ethylene for Counterexamples 1 and 2: additional amounts of monomers are introduced as the polymerization reaction consumes the monomers, continuously in the case of the ethylene (in order to keep the pressure constant and equal to 8.5 bar), and batchwise in the case of the butadiene, the amounts of which are added manually and determined according to the degree of monomer conversion;
(ii) a mode of continuous addition, for Examples 1 and 2, of ethylene and of butadiene in order to ensure the obtaining of an ethylene/butadiene copolymer having a homogeneous distribution of the various units: the amounts of ethylene and butadiene are added in a controlled manner according to the intended monomer composition of the liquid phase and in order to reach a reactor pressure of 8.5 bar.

3. Phase 3,

At the end of polymerization, the catalytic system is then deactivated by adding methanol, and antioxidants are added to the polymer solution. The solvent is evaporated off and the polymer is dried. Samples are taken throughout the polymerization so as to analyse the composition of the copolymer over time.

Table A-1 below describes the operating conditions for each of the four tests. Table A-2 shows the main characteristics of the copolymers thus obtained. Table A-3 below describes the average composition of the copolymer throughout the polymerization.

TABLE A-1

| | PHASE 1 | | | PHASES 1 + 2 | |
|---|---|---|---|---|---|
| | Solvent in kg | Butadiene introduced in kg | Ethylene introduced in kg | Total amount of butadiene injected in kg | Total amount of ethylene injected in kg |
| C-EX1 | 58 | 0.8 | 1.81 | 2.100 | 4.750 |
| C-EX2 | 57 | 1.2 | 1.60 | 2.825 | 3.755 |
| Ex 1 | 58.5 | 0 | 0 | 2.130 | 4.760 |
| Ex 2 | 57.5 | 0 | 0 | 2.825 | 3.750 |

TABLE A-2

| | Weight of polymer (in kg) | Polymerization time (in min.) | Tg in ° C. | % crystallinity | % E. | % B. 1,4 | % B. 1,2 | % C. |
|---|---|---|---|---|---|---|---|---|
| C-EX 1 | 5.5 | 120 | −36 | 22 | 82 | 5 | 7 | 6 |
| C-EX 2 | 5.2 | 180 | −44 | 0 | 70 | 8 | 15 | 7 |
| Ex 1 | 5.5 | 120 | −40 | 5 | 78 | 7 | 8 | 7 |
| Ex 2 | 5.2 | 180 | −40 | 0 | 67 | 8 | 17 | 8 |

TABLE A-3a

Comparison for compositions containing 20 mol % of Butadiene

| | Counterexample 1 | | | | Example 1 | | | |
|---|---|---|---|---|---|---|---|---|
| Time in min. | % E. | % B. 1,4 | % B. 1,2 | % C. | % E. | % B. 1,4 | % B. 1,2 | % C. |
| 10 | 65 | 7 | 21 | 7 | 80 | 6 | 7 | 7 |
| 30 | 70 | 6 | 15 | 9 | 79 | 7 | 8 | 6 |
| 50 | 75 | 6 | 12 | 7 | 80 | 7 | 7 | 6 |
| 70 | 78 | 5 | 9 | 8 | 79 | 6 | 8 | 7 |
| 120 | 82 | 5 | 7 | 6 | 78 | 7 | 8 | 7 |

TABLE A-3b

Comparison for compositions containing 30 mol % of Butadiene

| | Counterexample 2 | | | | Example 2 | | | |
|---|---|---|---|---|---|---|---|---|
| Time in min. | % E. | % B. 1,4 | % B. 1,2 | % C | % E. | % B. 1,4 | % B. 1,2 | % C. |
| 10 | 66 | 8 | 19 | 7 | 69 | 7 | 17 | 7 |
| 30 | 68 | 8 | 16 | 7 | 68 | 9 | 16 | 7 |
| 50 | 70 | 8 | 15 | 7 | 67 | 9 | 17 | 7 |
| 70 | 70 | 8 | 14 | 8 | 67 | 8 | 18 | 7 |
| 180 | 70 | 8 | 15 | 7 | 67 | 8 | 17 | 8 |

These two Tables A-3a and b illustrate that the percentage of each of the units of the copolymers according to the invention is constant throughout the polymerization, whereas, for the counterexamples, a fluctuation of about several % is observed between the first sample and the polymer recovered at the end of polymerization.

Examples—Part B

A series of copolymers was prepared according to a mode of synthesis identical to that of Counterexamples 1 and 2 above. The molar content of the ethylene units was determined, as was the degree of crystallinity. Another series of copolymers was prepared according to a mode of synthesis identical to that of Examples 1 and 2.

Figure 4:
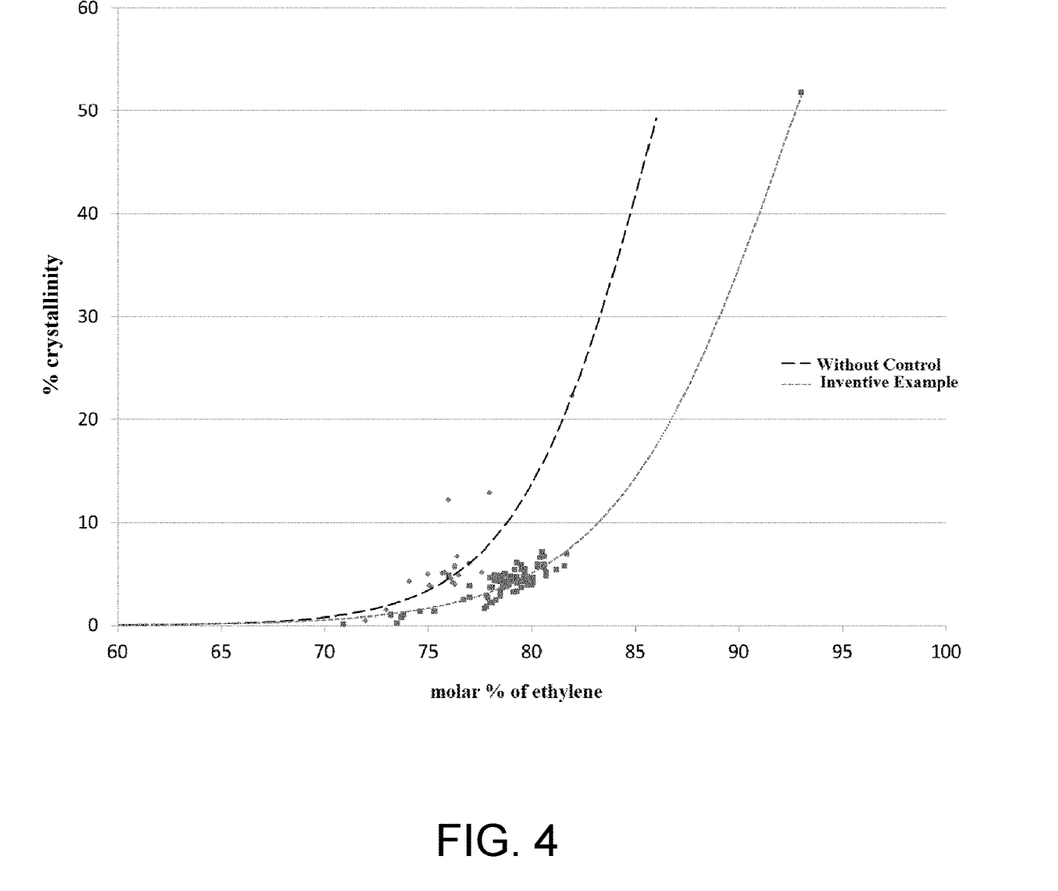
FIG. 4: percentage of crystallinity as a function of the molar percentage of ethylene incorporated for a copolymer without control (dashes) and for a copolymer according to the invention (dots).

The samples of each of the series constitute two populations, represented in FIG. 4.

This figure demonstrates, for the invention, a better degree of crystallinity/ethylene unit content compromise: for one and the same molar content of ethylene, the crystallinity is lower for the copolymers according to the invention.

Examples—Part C Copolymer According to the Invention Obtained by Digital Simulation The conditions for polymerization of the ethylene and butadiene according to the invention suppose that the concentration of each of the two monomers in the reaction medium remains constant. For any reaction of order greater than or equal to 1 with respect to the monomers, those skilled in the art deduce, in a trivial manner, that the rates of insertion of each unit into the chain also remain constant throughout the polymerization.

In the particular case of the invention, the prediction of the microstructure is calculated by the following equations:

$$\% \, units_E = \frac{R_1 + R_3 + R_4 + R_6 - 2R_8 + R_9}{R_1 + R_2 + R_3 + R_4 + R_5 + R_6 + R_7 - 2R_8 + R_9}$$

$$\% \, units_B = \frac{R_2 + R_5 + R_7 - R_8}{R_1 + R_2 + R_3 + R_4 + R_5 + R_6 + R_7 - 2R_8 + R_9}$$

$$\% \, units_C = 1 - \% \, units_E - \% \, units_B$$

Where:
% $units_E$ is the molar percentage of the ethylene units in the chain
% $units_B$ is the molar percentage of the butadiene units (1,4 and 1,2) in the chain
% $units_C$ is the molar percentage of the cyclic units in the chain
And R1 to R9 calculated as below $R1 = k_1 \%$ PE[E]

$R2 = k_2 \%$ PE[B]

$R3 = k_3 \%$ PB[E]

$R4 = k_1 \%$ PBE[E]

$R5 = k_2 \%$ PBE[B]

$R6 = k_1 \%$ PBEE[E]

$R7 = k_2 \%$ PBEE[B]

$R8 = k_4 \%$ PBEE $R9 = k_5 \%$ PC[E]

Where:

$k_1$ to $k_5$ are constants

[E], [B] are the concentrations of ethylene and butadiene in mol/l

% PE, % PB, % PBE, % PBEE and % PC calculated according to the system of equations below:

$$\frac{\%PE}{\%PB} = \left(\frac{k_1^2 k_3 [E]^3}{k_2(k_1[E]+k_2[B]+k_4)(k_1[E]+k_2[B])[B]} + \frac{k_1[E]}{k_2}\right)$$

$$\frac{\%PBE}{\%PB} = \frac{k_3[E]}{k_1[E]+k_2[B]}$$

$$\frac{\%PBEE}{\%PB} = \frac{k_1 k_3 [E]^2}{(k_1[E]+k_2[B]+k_4)(k_1[E]+k_2[B])}$$

$$\frac{\%PC}{\%PB} = \frac{k_1 k_3 k_4 [E]}{k_5(k_1[E]+k_2[B]+k_4)(k_1[E]+k_2[B])}$$

$$\%PB = \frac{1}{1 + \frac{\%PE}{\%PB} + \frac{\%PBE}{\%PB} + \frac{\%PBEE}{\%PB} + \frac{\%PC}{\%PB}}$$

Where the values of k2, k3, k4 and k5 are measured experimentally and then related to k1.

The table below represents typical values of the values k2, k3, k4 and k5 related to k1 for the catalytic systems that can be used in the polymerization process described in the invention.

TABLE 2

|       | Example value | Minimum value | Maximum value |
|-------|---------------|---------------|---------------|
| k1/k1 | 1.00          |               |               |
| k2/k1 | 1.60          | 1             | 5             |
| k3/k1 | 160.00        | 0.02          | 300           |
| k3/k1 | 0.80          | 0.1           | 2             |
| k5/k1 | 80.00         | 0.01          | 200           |

This mathematical model makes it possible to predict the distribution of the ethylene, butadiene and 1,2-cyclohexane units of an elastomer produced according to the invention as a function of the constants k1 to k5 and of the molar composition of ethylene and butadiene in the liquid phase.

Example of Validation of the Model for the Catalytic System Consisting of Metallocene [Me$_2$Si(Flu)$_2$Nd(BH$_4$)$_2$Li(THF)] in the Presence of Butyloctylmagnesium For this catalytic system, in the case of a copolymerization of ethylene and butadiene carried out in a manner identical to Examples 1 and 2 of part A, it was possible to determine the values given in Table 2 above, whatever the value of k1 between 0 and $10^{20}$ l/mol/min, or higher.

By way of example, the table below compares the results of Examples 1 and 2 according to the invention of part A and the results obtained with the mathematical model and its constants.

TABLE 3

|                         | Ex 1 | Simulated EX 1 | Ex 2 | Simulated EX 2 |
|-------------------------|------|----------------|------|----------------|
| % Ethylene units        | 78   | 76             | 67   | 69             |
| % Butadiene units       | 15   | 17             | 25   | 24             |
| % 1,2-Cyclohexane units | 7    | 7              | 8    | 7              |

According to this table, it is concluded that the model makes it possible to predict the microstructures potentially attainable according to the invention.

Example of the Microstructures Attainable Using the Metallocene Catalytic System [Me$_2$Si(Flu)$_2$Nd(BH$_4$)$_2$Li(THF)] in the Presence of Butyloctylmagnesium According to the Mathematical Model The examples below describe the microstructure obtained at various pressure levels, 5, 8.5 and 70 bar, for various compositions of the feed. The molar fraction of ethylene is between 0.5 and 0.99.

The pressure is involved in the calculation of total concentration of the monomers in liquid phase. The equation below makes it possible to calculate the pressure of the reactor (P) in bar on the basis of the concentration of butadiene and ethylene in mol/l.

$$P = \frac{-0.0391955([B]+[E])^3 + 0.35893([B]+[E])^2 + 8.53776([B]+[E])^3 + 0.873373}{1.01325}$$

This equation is valid for the system: ethylene, butadiene in the MCH solvent.

The table below shows the prediction of the microstructures accessible at 5 bar.

TABLE 4

| [ethylene] mol/l | [butadiene] mol/l | % Ethylene (Liq) | % Butadiene (Liq) | % E | % B | % C |
|------------------|-------------------|------------------|-------------------|-----|-----|-----|
| 0.241 | 0.241 | 50% | 50% | 58% | 33% | 9%  |
| 0.289 | 0.193 | 60% | 40% | 62% | 27% | 10% |
| 0.337 | 0.145 | 70% | 30% | 68% | 21% | 11% |
| 0.386 | 0.096 | 80% | 20% | 75% | 14% | 10% |
| 0.434 | 0.048 | 90% | 10% | 86% | 7%  | 7%  |
| 0.477 | 0.005 | 99% | 1%  | 98% | 1%  | 1%  |

The table below shows the prediction of the microstructures accessible at 8.5 bar.

TABLE 5

| [Ethylene] mol/l | [Butadiene] mol/l | % Ethylene (Liq) | % Butadiene (Liq) | % E | % B | % C |
|------------------|-------------------|------------------|-------------------|-----|-----|-----|
| 0.439 | 0.439 | 50% | 50% | 59% | 34% | 6% |
| 0.527 | 0.351 | 60% | 40% | 63% | 29% | 8% |
| 0.614 | 0.263 | 70% | 30% | 69% | 23% | 8% |
| 0.702 | 0.176 | 80% | 20% | 76% | 16% | 8% |
| 0.790 | 0.088 | 90% | 10% | 86% | 8%  | 5% |
| 0.869 | 0.009 | 99% | 1%  | 98% | 1%  | 1% |

The table below shows the prediction of the microstructures accessible at 70 bar.

TABLE 6

| [Ethylene] mol/l | [Butadiene] mol/l | % Ethylene (Liq) | % Butadiene (Liq) | % E | % B | % C |
|---|---|---|---|---|---|---|
| 3.916 | 3.916 | 50% | 50% | 61% | 37% | 1% |
| 4.699 | 3.133 | 60% | 40% | 66% | 33% | 1% |
| 5.482 | 2.350 | 70% | 30% | 71% | 28% | 1% |
| 6.266 | 1.566 | 80% | 20% | 77% | 21% | 1% |
| 7.049 | 0.783 | 90% | 10% | 87% | 12% | 1% |
| 7.754 | 0.078 | 99% | 1% | 98% | 1% | <0%-<1% |

In the three tables above, Liq=liquid. The percentage % Ethylene (Liq) or % Butadiene (Liq) corresponds to the molar percentage of ethylene, respectively butadiene, in the reaction medium, relative to the total number of moles of butadiene and ethylene in the reaction medium.

According to the results of the tables above, it is observed that the microstructure of the ethylene/butadiene copolymers produced according to the invention can be controlled by controlling the composition of the reaction medium and the pressure of the reactor.

For example:
For the pressure range from 5 to 70 bar, the content of 1,2-cyclohexane units can vary by a value close to from 0%, but greater than 0%, to 10%.
at 8.5 bar, the content of 1,2 cyclohexane units has a maximum at 7% for ethylene contents in the liquid phase of between 70% and 80% relative to the total monomers.

The invention claimed is:

1. An ethylene/butadiene copolymer comprising, statistically distributed, ethylene units, butadiene units, trans-1,2-cyclohexane units, the molar fraction of ethylene units in said copolymer being greater than or equal to 50%, relative to the total number of moles of ethylene, butadiene and trans-1,2-cyclohexane units, wherein the microstructure of the copolymer is homogeneous and thus the molar concentration of each of the units is constant all along the chain of the copolymer.

2. An ethylene/butadiene copolymer according to claim 1, wherein the molar fraction of ethylene units ranges from 50 mol % to 95 mol %, relative to the total number of moles of ethylene, butadiene and trans-1,2-cyclohexane units.

3. An ethylene/butadiene copolymer according to claim 1, wherein the molar fraction of trans-1,2-cyclohexane units is between 0 mol % and 25 mol %, relative to the total number of moles of ethylene, butadiene and trans-1,2-cyclohexane units.

4. An ethylene/butadiene copolymer according to claim 1, wherein said copolymer has a crystallinity of less than 20%.

5. An ethylene/butadiene copolymer according to claim 1, wherein said copolymer has a crystallinity of less than 10%.

6. A semi-continuous process for preparing an ethylene/butadiene copolymer according to claim 1, comprising the solution polymerization, in a hydrocarbon solvent, at a temperature of between 0° C. and 200° C., of ethylene and butadiene in the presence of a catalytic system allowing the formation of trans-1,2-cyclohexane cyclic units in the polymer chain, in a stirred reactor, wherein the polymerization is carried out at constant temperature and at constant ethylene pressure and constant butadiene pressure, wherein the ethylene and butadiene are injected continuously into the reactor and wherein, in the reaction medium, at each instant of polymerization, the ethylene and butadiene concentrations are constant.

7. A process according to claim 6, wherein the composition of the reaction medium is continuously analysed and the ethylene and butadiene injection flow rates are adjusted so as to maintain, in the reaction medium, constant ethylene and butadiene concentrations.

8. A process according to claim 6, wherein the ethylene and butadiene injection flow rates are adjusted so as to maintain a constant ethylene pressure and a constant butadiene pressure in the reactor.

9. A process according to claim 8, wherein the ethylene and the butadiene are injected according to a predetermined flow ratio.

10. A process according to claim 8, wherein a composition comprising the ethylene and the butadiene at constant ethylene and butadiene concentrations is injected.

11. A process according to claim 6, wherein the catalytic system comprises at least two constituents, on the one hand a metallocene corresponding to formula (I):

$$[P(Cp^1)(Cp^2)Met] \qquad (I)$$

with:
Met being a group comprising:
at least one scandium or yttrium atom or one atom of lanthanide, the atomic number of which ranges from 57 to 71,
at least one monovalent ligand, belonging to the halogen group, to the amide, alkyl or borohydride group,
optionally other constituents,
P being a group, based on at least one silicon or carbon atom, bridging the two groups $Cp^1$ and $Cp^2$
$Cp^1$ and $Cp^2$ are identical to or different from one another,
when $Cp^1$ and $Cp^2$ are identical to one another, they are selected from indenyls substituted in the 2 position, from substituted or unsubstituted fluorenyls,
when $Cp^1$ and $Cp^2$ are different from one another, $Cp^1$ is selected from substituted or unsubstituted fluorenyls, $Cp^2$ is selected from cyclopentadienyls substituted in the 2 and 5 positions, from indenyls substituted in the 2 position, from substituted fluorenyls;
on the other hand, a co-catalyst which is an alkyl magnesium, an alkyl lithium, an alkyl aluminium, a Grignard reagent or a mixture of these constituents.

12. A process according to claim 11, wherein the monovalent ligand comprised in Met is chlorine, iodine, bromine or fluorine.

13. A process according to claim 11, wherein the other constituents comprised in Met are complexing molecules which are either ether or amine groups.

14. A process according to claim 11, wherein indenyls substituted in the 2 position are selected from the group consisting of 2-methylindenyl and 2-phenylindenyl, substituted or unsubstituted fluorenyls are selected from the group consisting of fluorenyl, 2,7-di-tert-butylfluorenyl and 3,6-di-tert-butylfluorenyl and cyclopentadienyls substituted in the 2 and 5 positions are tetramethylcyclopentadiene.

15. An ethylene/butadiene copolymer obtained by means of a process comprising the solution polymerization, in a hydrocarbon solvent, at a temperature of between 0° C. and 200° C., of ethylene and butadiene in the presence of a catalytic system allowing formation of trans-1,2-cyclohexane cyclic units in the polymer chain, in a stirred reactor, wherein the polymerization is carried out at constant temperature and at constant ethylene pressure and constant butadiene pressure, wherein the ethylene and butadiene are injected continuously into the reactor and wherein, in the reaction medium, at each instant of polymerization, the ethylene and butadiene concentrations are constant, and wherein the microstructure of the copolymer is homogeneous.

16. An ethylene/butadiene copolymer according to claim 1, which is an elastomer.

17. An ethylene/butadiene copolymer according to claim 15, which is an elastomer.

18. A composition comprising a copolymer according to claim 1.

19. A composition comprising a copolymer according to claim 15.

20. A tire, one of the constituent elements of which comprises a composition according to claim 18.

* * * * *